May 8, 1934.  C. B. HEBBARD  1,957,887
ADJUSTABLE PROPELLER
Filed March 17, 1933   2 Sheets-Sheet 2
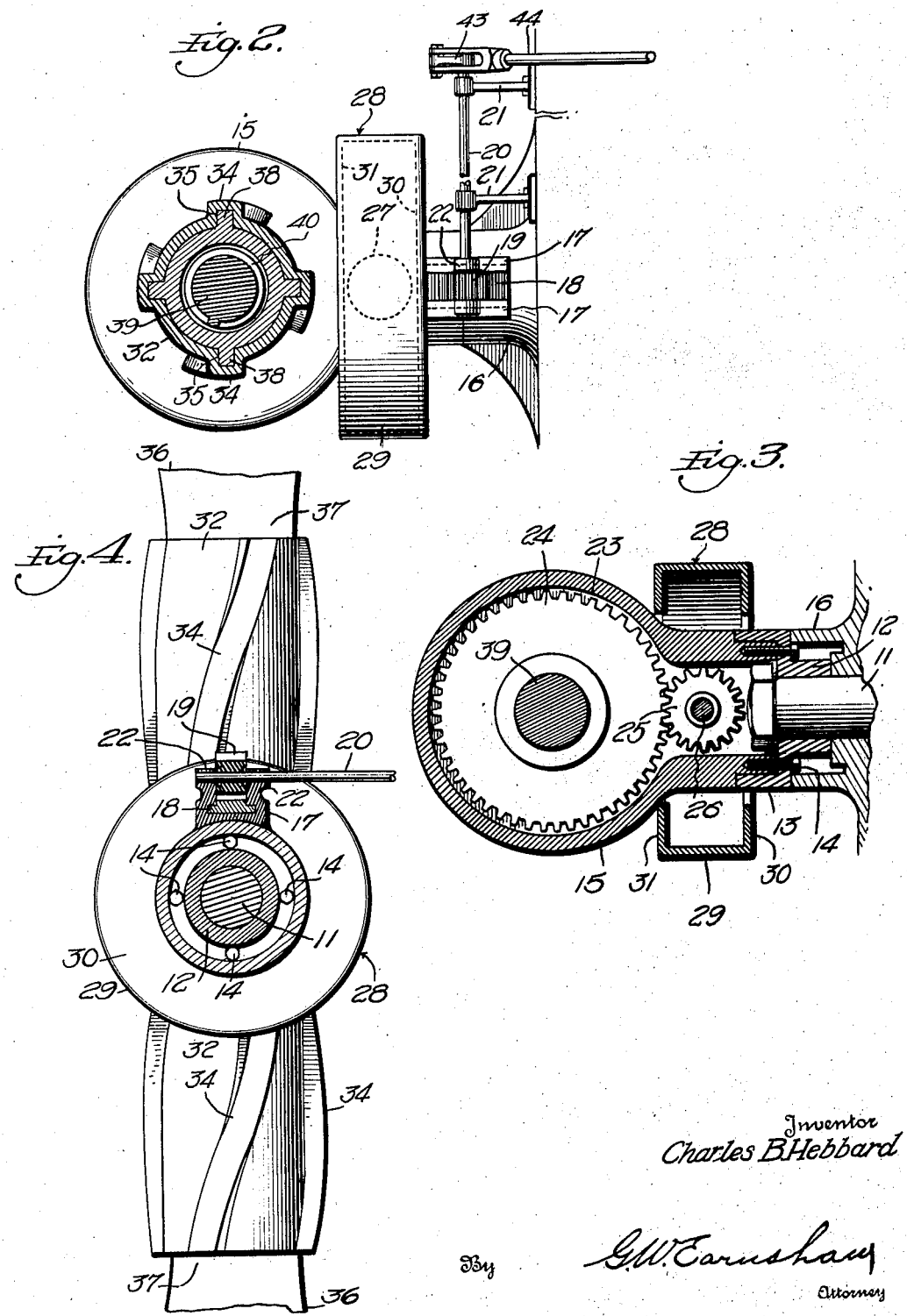
Inventor
Charles B. Hebbard
By G.W. Earnshaw
Attorney Patented May 8, 1934

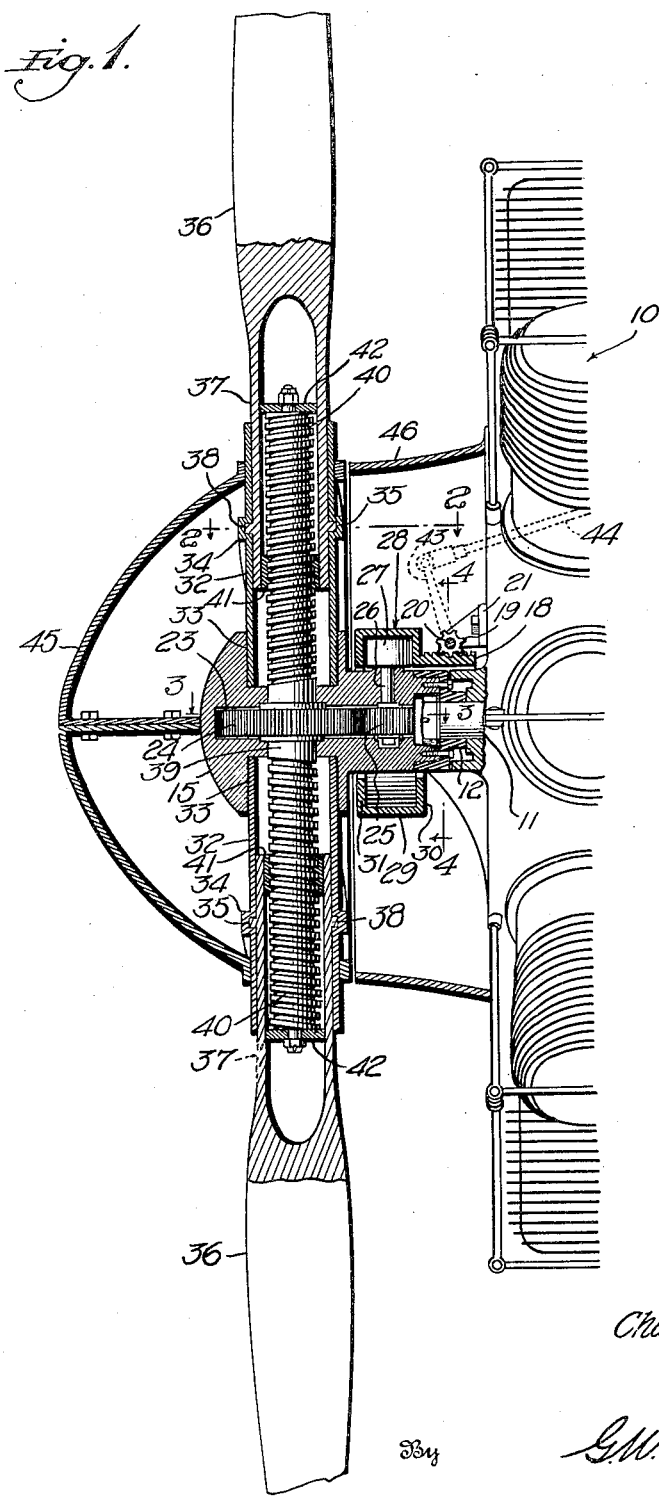

1,957,887

UNITED STATES PATENT OFFICE 1,957,887

ADJUSTABLE PROPELLER

Charles B. Hebbard, Joplin, Mo.

Application March 17, 1933, Serial No. 661,373

5 Claims. (Cl. 170—163)

This invention relates to adjustable propellers, and more particularly to propelling devices for aircraft.

An important object of the invention is to provide novel means easily operable from the driver's seat for varying the pitch of the propeller of an aircraft.

A further object is to provide a device of the character referred to wherein the length of the propelling blade is varied simultaneously with adjustments in the pitch of the blades, whereby both increased pitch and increased blade lengths may be obtained by a single operation.

A further object is to provide a propeller of general application but particularly for aircraft work wherein suitable means is provided for varying the pitch of the propeller blades, but wherein the adjusting means is irreversible whereby fluid pressures operating against the blades are not effective for changing the pitch thereof.

A further object is to provide easily operable means for simultaneously varying the pitches of all of the blades of a propeller, and wherein the means employed causes the blades to be always maintained at the same pitch with respect to each other.

A further object is to provide normally inoperative means adapted to be rendered operative for vary the pitch of the blades of the propeller, and wherein the rotational force of the propeller is utilized for varying the pitch of the blades.

Other objects and advantages of the invention will be apparent during the course of the following description.

In the drawings I have shown one embodiment of the invention. In this showing,

Figure 1 is a central vertical sectional view showing the propeller mechanism in operative position with respect to an aircraft motor, parts being shown in elevation, Figure 2 is a section on line 2—2 of Figure 1, parts being omitted, Figure 3 is a section taken substantially on line 3—3 of Figure 1, parts being shown in elevation, and Figure 4 is a similar view taken substantially on line 4—4 of Figure 1.

Referring to Figure 1, the numeral 10 designates an aircraft motor of any type shown in the present instance as being of the radial cylinder type. The motor is provided with a crank shaft 11 through which rotational force is imparted to the propeller in a manner to be referred to. A sleeve 12 surrounds the end of the crank shaft and is provided with an enlarged cylindrical outer end 13. The sleeve member 12 is secured by screws 14 to a hub member indicated as a whole by the numeral 15.

A portion of the crank case of the motor 10 surrounds the inner end portion of the sleeve 12 as at 16. A pair of guides 17 is carried by the crank case extension 16 and slidably supports a rack 18. This rack is engaged by a pinion 19 carried by a shaft 20 supported in suitable bearing brackets 21 carried by the motor. On opposite sides of the pinion 19, the guides 17 are preferably provided with upstanding bearings 22 supporting the shaft 20.

The hub 15 is provided with an internal recess 23 in which is arranged a gear 24 and a pinion 25 meshing therewith. A shaft 26 carries the pinion 25 and is journaled in the hub 15 as shown in Figure 1. A friction wheel 27 is carried by the radially outer end of the shaft 26. A friction wheel indicated as a whole by the numeral 28 surrounds the inner portion of the hub 15 as shown. The friction wheel is preferably formed integral with the rack 18 and comprises a cylindrical wall 29 having inwardly extending radial end walls 30 and 31 arranged on opposite sides of the wheel 27. It will be apparent that the space between the walls 30 and 31 is slightly greater than the diameter of the wheel 27.

Referring to Figure 1, the numeral 32 designates a plurality of sleeves corresponding in number to the number of propeller blades employed. In the present instance, two of the sleeves 32 have been illustrated, and they have their inner ends projecting into radial recesses 33 formed in the hub member 15. Each sleeve 32 is provided with spiral external ribs 34 forming internal spiral spline grooves 35. The sleeves 32 are rigidly connected in any suitable manner to the hub 15 to be driven thereby about the axis of the crank shaft, and the spline grooves 35 are employed in the manner to be described for varying the pitches of the propellers.

In the present instance two propellers 36 have been illustrated, and each has a hollow cylindrical end 37 projecting into the outer end of one of the sleeves 32. The inner ends of the propellers are provided with preferably integral splines 38 slidable in the spline grooves 35. It will be apparent that the spline grooves and their associated splines are very high pitched with respect to the axis of the sleeves 32, and accordingly the propellers are movable radially with respect to the crank shaft upon the application of a radial force but are not movable in such manner by the application of a torque applied to the propeller blades with respect to the axis of the sleeves 32.

An operating shaft indicated as a whole by the numeral 39 is connected centrally thereof to the gear 24 and projects diametrically with respect to the axis of the crank shaft. The opposite ends of the shaft 39 are oppositely pitched as at 40 for engagement in feed nuts 41 carried by the inner ends of the propeller blades internally thereof. Guide disks 42 are carried by the radially outer ends of the screws 40 to prevent any play between the screws and the walls of the hollow inner ends of the propeller blades.

Any desired means may be employed for effecting rotation of the shaft 20 and pinion 19. In the present instance the shaft is shown as being provided with a crank arm 43 operable through a rod 44 leading to the driver's position in the cabin or cock-pit of the aircraft.

A spinner 45 is preferably arranged forwardly of the device surrounding the forward portion of the hub 15. The housing 45 is streamlined to reduce wind resistance and the sleeves 32 project through the housing 45 to be braced thereby. A stationary shield 46 is preferably connected to the motor and projects forwardly therefrom to form in effect a continuation of the housing 45.

The operation of the device is as follows:

As previously stated, any torque or twisting force applied to the blades 36 with respect to the axis of the shaft 39 will not cause the propeller blades to rotate about such axis due to the high pitch of the splined grooves 35. Accordingly the propeller blades will remain in a fixed position without any attention on the part of the operator or any specially applied force such as a brake device. Accordingly, the device requires no attention once the blades have been properly adjusted until a different adjustment is desired. When the operator desires to increase the pitch of the blades, assuming that the propeller is rotating in a counterclockwise direction, as viewed in Figure 4, it merely is necessary for the operator to exert a pull on the rod 44, thus rotating the pinion 19 to move the rack 18 forwardly. This operation moves the wheel 28 forwardly to bring the wall 30 into frictional engagement with the wheel 27. The wheel 28 is fixed against rotation while the wheel 27 rotates with the propeller, and accordingly the operation referred to causes the wheel 27 to roll against the wall 30, thus rotating the shaft 26 and pinion 25 in a counterclockwise direction as viewed in Figure 3.

The rotation of the pinion 25 under the conditions referred to imparts rotational movement to the gear 24 whereby this gear is caused to rotate in a clockwise direction as viewed in Figure 3, and similar rotation will be imparted to the screw-threaded portions 40 of the shaft 39. These threaded portions of the shaft 39 are oppositely threaded, as previously stated, and their rotation in the manner referred to causes the feed nuts 41 to be moved radially outwardly with respect to the axis of the rotation of the crank shaft. Similar radially outward movement is imparted to the propeller blades 36, and these blades accordingly are caused to rotate about the axis of the shaft 39 due to the engagement of the splines 38 in the grooves 35. Thus the pitches of the blades will be increased and the increase in pitch may be carried out to any desired extent depending upon the number of rotations imparted to the friction wheel 27. While the propeller blades are being rotated about the axis of the screw 39 to progressively increase their pitches, it will be apparent that the blades will be moved radially outwardly with respect to the axis of the crank shaft, thus increasing the effective diameter of the propeller.

When it is desired to decrease the diameter and pitch of the propeller, the operator is required merely to exert a push on rod 44, whereupon the pinion 19 will rotate in a counterclockwise direction to move the wheel 28 inwardly. This action brings the wall 31 of the friction wheel 28 into frictional engagement with the wheel 27, and the pinion 25, gear 24 and shaft 39 will be rotated to move the propellers radially inwardly to decrease their diameter and at the same time to rotate the propellers about the axis of the shaft 39 to decrease the pitches of the propellers.

From the foregoing, it will be apparent that the present device provides simple, easily operated means for varying the pitches of a plurality of propeller blades, the pitches being simultaneously changed to exactly the same extent. It also will be apparent that the effective diameter of the propeller is varied simultaneously with the pitches. Moreover, the device is easily operable at any time, and does not require any locking or braking means for holding the propeller blades in any desired adjusted positions.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. A device of the character described comprising a hub, a plurality of unitary propeller blades projecting radially outwardly from said hub, means connected to said hub for supporting said propeller blades with respect to said hub and having portions engaging portions of said blades to rotate the latter on their own axes upon radial movement with respect to the axis of rotation of said hub, a shaft having threaded connection with said blades and rotatable for effecting movement of said blades radially with respect to the axis of rotation of said hub, and manually controlled means for utilizing the rotational force of said blades about the axis of rotation of said hub at any rotational speed for rotating said shaft.

2. A device constructed in accordance with claim 1 wherein the means for rotating said shaft comprises a friction roller, a friction surface fixed against rotation about the axis of said hub and movable into engagement with said roller, and driving connections between said roller and said shaft.

3. A device of the character described comprising a hub, a pair of diametrically opposite sleeves fixed to said hub and projecting radially outwardly therefrom, a unitary propeller blade having its inner end fitting and arranged in the outer end of each sleeve, each propeller and its associated sleeve having high pitched spiral splined connection with each other, a shaft extending diametrically through said hub and having oppositely pitched threaded ends respectively engaging the inner end of said blades, and manually controlled means for utilizing the rotational force of said blades about the axis of rotation of said hub at any rotational speed for rotating said shaft.

4. A device constructed in accordance with claim 3 wherein the means for rotating said shaft comprises a friction roller, a friction member fixed against rotation about the axis of said hub and movable longitudinally with respect thereto, said member having surfaces engageable selectively with opposite sides of said roller upon longitudinal movement of said member, and driving connections between said roller and said shaft.

5. A device constructed in accordance with claim 3 wherein the means for rotating said shaft comprises a friction roller, a friction member fixed against rotation about the axis of said hub and movable longitudinally with respect thereto, said member having surfaces engageable selectively with opposite sides of said roller upon longitudinal movement of said member, a rack carried by said friction member and extending substantially parallel to the axis of said hub, a pinion meshing with said rack, and driving connections between said roller and said shaft.

CHARLES B. HEBBARD.